United States Patent
Jiang et al.

(10) Patent No.: US 9,077,793 B2
(45) Date of Patent: *Jul. 7, 2015

(54) CARBON NANOTUBE BASED FLEXIBLE MOBILE PHONE

(75) Inventors: Kai-Li Jiang, Beijing (CN); Liang Liu, Beijing (CN); Qun-Qing Li, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 1212 days.

This patent is subject to a terminal disclaimer.

(21) Appl. No.: 12/653,244

(22) Filed: Dec. 10, 2009

(65) Prior Publication Data

US 2010/0317409 A1    Dec. 16, 2010

(30) Foreign Application Priority Data

Jun. 12, 2009   (CN) .......................... 2009 1 0107864

(51) Int. Cl.
*H04M 11/00*   (2006.01)
*H04M 3/42*    (2006.01)
(Continued)

(52) U.S. Cl.
CPC ........... *H04M 1/0268* (2013.01); *G06F 1/1626* (2013.01); *G06F 1/1652* (2013.01); *H04M 1/0214* (2013.01); *H04M 2250/22* (2013.01)

(58) Field of Classification Search
CPC ........ B82Y 10/00; B82Y 15/00; B82Y 20/00; B82Y 30/00; B82Y 40/00; B82Y 99/00; G02F 1/1337; G02F 1/133711; H01L 29/0665; H01L 29/0673; H01L 51/0048; H01L 51/0097; H01L 51/444; H01L 23/60; H01L 23/62; H01L 23/373; H01L 23/433; H01L 51/0021; H01L 51/0595; H01L 51/5203; H01L 51/5206; H01L 29/785; H04M 1/0214; H04M 1/0268; H04M 1/02; H04M 1/0202; H04M 1/23; H04M 1/3833; D01F 9/12; D01F 11/14; D01F 11/121; D01F 9/127; C01B 31/0233; C01B 31/0273; C04B 35/52; C04B 35/62218; C04B 41/009; C23C 16/26; C23C 16/45523; D02G 3/02; D02G 3/16; D02G 3/28; H01B 1/24; H01B 1/127; H01B 1/0688; H01G 11/36; H01M 4/04; H82Y 30/00; D01D 5/253
USPC ............... 455/24, 50, 403, 414.1, 566, 575.1; 73/774, 777; 174/98, 254; 257/15, 77, 257/213; 313/309, 495; 345/174; 349/123, 349/161; 381/190; 428/195.1, 408
See application file for complete search history.

(56) References Cited

U.S. PATENT DOCUMENTS

| | | |
|---|---|---|
| 4,659,873 A | 4/1987 | Gibson et al. |
| 4,922,061 A | 5/1990 | Meadows et al. |

(Continued)

FOREIGN PATENT DOCUMENTS

| | | |
|---|---|---|
| CN | 2539375 | 3/2003 |
| CN | 1447279 | 10/2003 |

(Continued)

OTHER PUBLICATIONS

Susuki et al."Investigation of physical and electric properties of silver pastes as binder for thermoelectric materials". Review of Scientific Instruments,76,(2005);pp. 023907-1 to 023907-5.

(Continued)

*Primary Examiner* — Yuwen Pan
*Assistant Examiner* — Paul P Tran
(74) *Attorney, Agent, or Firm* — Novak Druce Connolly Bove + Quigg LLP

(57) ABSTRACT

A carbon nanotube based flexible mobile phone includes a flexible body including a flexible display panel a flexible touch panel, and a communicating system received therein. The flexible touch panel is disposed on a surface of the flexible display panel. The flexible touch panel includes at least one carbon nanotube layer including a carbon nanotube film.

7 Claims, 11 Drawing Sheets

(51) Int. Cl.

| | | |
|---|---|---|
| *H04M 1/00* | (2006.01) | |
| *H04B 1/38* | (2006.01) | |
| *G01B 7/16* | (2006.01) | |
| *G01L 1/00* | (2006.01) | |
| *H02G 3/04* | (2006.01) | |
| *H05K 1/00* | (2006.01) | |
| *H01L 29/06* | (2006.01) | |
| *H01L 31/00* | (2006.01) | |
| *H01L 29/15* | (2006.01) | |
| *H01L 31/0312* | (2006.01) | |
| *H01L 29/76* | (2006.01) | |
| *H01J 1/00* | (2006.01) | |
| *H01J 19/06* | (2006.01) | |
| *H01J 1/62* | (2006.01) | |
| *H01J 63/04* | (2006.01) | |
| *G06F 3/041* | (2006.01) | |
| *G06F 3/045* | (2006.01) | |
| *G02F 1/1337* | (2006.01) | |
| *G02F 1/141* | (2006.01) | |
| *G02F 1/1333* | (2006.01) | |
| *B06B 1/06* | (2006.01) | |
| *H04R 25/00* | (2006.01) | |
| *D01F 9/12* | (2006.01) | |
| *B41M 5/00* | (2006.01) | |
| *B44C 1/17* | (2006.01) | |
| *G03G 7/00* | (2006.01) | |
| *B32B 9/00* | (2006.01) | |
| *D02G 3/00* | (2006.01) | |
| *H01L 21/00* | (2006.01) | |
| *H01J 9/00* | (2006.01) | |
| *H04M 1/02* | (2006.01) | |
| *G06F 1/16* | (2006.01) | |

(56) References Cited

U.S. PATENT DOCUMENTS

| | | | |
|---|---|---|---|
| 4,933,660 A | 6/1990 | Wynne, Jr. | |
| 5,181,030 A | 1/1993 | Itaya et al. | |
| 5,853,877 A | 12/1998 | Shibuta | |
| 5,861,583 A | 1/1999 | Schediwy et al. | |
| 5,931,764 A | 8/1999 | Freeman et al. | |
| 6,373,472 B1 | 4/2002 | Palalau et al. | |
| 6,423,583 B1 | 7/2002 | Avouris et al. | |
| 6,628,269 B2 | 9/2003 | Shimizu | |
| 6,629,833 B1 | 10/2003 | Ohya et al. | |
| 6,914,640 B2 | 7/2005 | Yu | |
| 6,947,203 B2 | 9/2005 | Kanbe | |
| 7,045,108 B2* | 5/2006 | Jiang et al. | 423/447.2 |
| 7,054,064 B2 | 5/2006 | Jiang et al. | |
| 7,060,241 B2 | 6/2006 | Glatkowski | |
| 7,071,927 B2 | 7/2006 | Blanchard | |
| 7,084,933 B2 | 8/2006 | Oh et al. | |
| 7,196,463 B2 | 3/2007 | Okai et al. | |
| 7,215,329 B2 | 5/2007 | Yoshikawa et al. | |
| 7,242,136 B2 | 7/2007 | Kim et al. | |
| 7,336,261 B2 | 2/2008 | Yu | |
| 7,348,966 B2 | 3/2008 | Hong et al. | |
| 7,355,592 B2 | 4/2008 | Hong et al. | |
| 7,532,182 B2 | 5/2009 | Tseng et al. | |
| 7,593,004 B2 | 9/2009 | Spath et al. | |
| 7,630,040 B2* | 12/2009 | Liu et al. | 349/123 |
| 7,662,732 B2 | 2/2010 | Choi et al. | |
| 7,663,607 B2 | 2/2010 | Hotelling et al. | |
| 7,678,452 B2* | 3/2010 | Kim et al. | 428/408 |
| 7,704,480 B2 | 4/2010 | Jiang et al. | |
| 7,710,649 B2 | 5/2010 | Feng et al. | |
| 7,796,123 B1 | 9/2010 | Irvin, Jr. et al. | |
| 7,825,911 B2 | 11/2010 | Sano et al. | |
| 7,854,992 B2 | 12/2010 | Fu et al. | |
| 7,904,061 B1* | 3/2011 | Zaffino et al. | 455/414.1 |
| 7,947,977 B2 | 5/2011 | Jiang et al. | |
| 7,956,525 B2* | 6/2011 | Armitage et al. | 313/309 |
| 8,346,316 B2* | 1/2013 | Jiang et al. | 455/575.1 |
| 2002/0089492 A1 | 7/2002 | Ahn et al. | |
| 2003/0044608 A1* | 3/2003 | Yoshizawa et al. | 428/398 |
| 2003/0122800 A1 | 7/2003 | Yu | |
| 2003/0147041 A1 | 8/2003 | Oh et al. | |
| 2003/0189235 A1 | 10/2003 | Watanabe et al. | |
| 2004/0047038 A1 | 3/2004 | Jiang et al. | |
| 2004/0053780 A1 | 3/2004 | Jiang et al. | |
| 2004/0099438 A1 | 5/2004 | Arthur et al. | |
| 2004/0105040 A1 | 6/2004 | Oh et al. | |
| 2004/0136896 A1 | 7/2004 | Liu et al. | |
| 2004/0191157 A1 | 9/2004 | Harutyunyan et al. | |
| 2004/0251504 A1 | 12/2004 | Noda | |
| 2005/0110720 A1 | 5/2005 | Akimoto et al. | |
| 2005/0142978 A1* | 6/2005 | Yotani et al. | 445/50 |
| 2005/0151195 A1 | 7/2005 | Kavase et al. | |
| 2005/0209392 A1 | 9/2005 | Luo et al. | |
| 2006/0010996 A1 | 1/2006 | Jordan et al. | |
| 2006/0022221 A1 | 2/2006 | Furukawa et al. | |
| 2006/0044284 A1 | 3/2006 | Tanabe | |
| 2006/0061704 A1 | 3/2006 | Hayano et al. | |
| 2006/0077147 A1 | 4/2006 | Palmateer et al. | |
| 2006/0097991 A1 | 5/2006 | Hotelling et al. | |
| 2006/0171032 A1 | 8/2006 | Nishioka | |
| 2006/0187213 A1 | 8/2006 | Su | |
| 2006/0187369 A1 | 8/2006 | Chang | |
| 2006/0188721 A1 | 8/2006 | Irvin, Jr. et al. | |
| 2006/0213251 A1 | 9/2006 | Rinzler et al. | |
| 2006/0240605 A1 | 10/2006 | Moon et al. | |
| 2006/0262055 A1 | 11/2006 | Takahara | |
| 2006/0263588 A1 | 11/2006 | Handa et al. | |
| 2006/0274047 A1 | 12/2006 | Spath et al. | |
| 2006/0274048 A1 | 12/2006 | Spath et al. | |
| 2006/0274049 A1 | 12/2006 | Spath et al. | |
| 2006/0275956 A1 | 12/2006 | Konesky | |
| 2006/0278444 A1 | 12/2006 | Binstead | |
| 2007/0065651 A1 | 3/2007 | Glatkowski et al. | |
| 2007/0075619 A1 | 4/2007 | Jiang et al. | |
| 2007/0081681 A1 | 4/2007 | Yu et al. | |
| 2007/0085838 A1 | 4/2007 | Ricks et al. | |
| 2007/0099333 A1 | 5/2007 | Moriya | |
| 2007/0115413 A1* | 5/2007 | Liu et al. | 349/123 |
| 2007/0165004 A1 | 7/2007 | Seelhammer et al. | |
| 2007/0182720 A1 | 8/2007 | Fujii et al. | |
| 2007/0215841 A1 | 9/2007 | Ford et al. | |
| 2007/0237952 A1* | 10/2007 | Jiang et al. | 428/367 |
| 2007/0257894 A1 | 11/2007 | Philipp | |
| 2007/0262687 A1 | 11/2007 | Li | |
| 2007/0279556 A1 | 12/2007 | Wang et al. | |
| 2007/0296897 A1 | 12/2007 | Liu et al. | |
| 2007/0298253 A1 | 12/2007 | Hata et al. | |
| 2008/0007535 A1 | 1/2008 | Li | |
| 2008/0029292 A1 | 2/2008 | Takayama et al. | |
| 2008/0048996 A1 | 2/2008 | Hu et al. | |
| 2008/0088219 A1 | 4/2008 | Yoon et al. | |
| 2008/0095694 A1 | 4/2008 | Nakayama et al. | |
| 2008/0129666 A1 | 6/2008 | Shimotono et al. | |
| 2008/0138589 A1 | 6/2008 | Wakabayashi et al. | |
| 2008/0170982 A1 | 7/2008 | Zhang et al. | |
| 2008/0192014 A1 | 8/2008 | Kent et al. | |
| 2008/0238882 A1 | 10/2008 | Sivarajan et al. | |
| 2008/0248235 A1 | 10/2008 | Feng et al. | |
| 2008/0266273 A1 | 10/2008 | Slobodin et al. | |
| 2008/0299031 A1 | 12/2008 | Liu et al. | |
| 2009/0032777 A1 | 2/2009 | Kitano et al. | |
| 2009/0056854 A1 | 3/2009 | Oh et al. | |
| 2009/0059151 A1 | 3/2009 | Kim et al. | |
| 2009/0101488 A1 | 4/2009 | Jiang et al. | |
| 2009/0153511 A1 | 6/2009 | Jiang et al. | |
| 2009/0153513 A1 | 6/2009 | Liu et al. | |
| 2009/0153514 A1 | 6/2009 | Jiang et al. | |
| 2009/0153516 A1 | 6/2009 | Liu et al. | |
| 2009/0167707 A1* | 7/2009 | Jiang et al. | 345/173 |
| 2009/0167709 A1 | 7/2009 | Jiang et al. | |
| 2009/0208708 A1 | 8/2009 | Wei et al. | |
| 2009/0283211 A1 | 11/2009 | Matsuhira | |
| 2009/0293631 A1 | 12/2009 | Radivojevic | |

(56) References Cited

U.S. PATENT DOCUMENTS

| | | | |
|---|---|---|---|
| 2010/0001972 A1 | 1/2010 | Jiang et al. | |
| 2010/0001975 A1 | 1/2010 | Jiang et al. | |
| 2010/0001976 A1 | 1/2010 | Jiang et al. | |
| 2010/0007619 A1 | 1/2010 | Jiang et al. | |
| 2010/0007624 A1 | 1/2010 | Jiang et al. | |
| 2010/0007625 A1 | 1/2010 | Jiang et al. | |
| 2010/0028656 A1* | 2/2010 | Kim et al. | 428/323 |
| 2010/0065788 A1 | 3/2010 | Momose et al. | |
| 2010/0078067 A1 | 4/2010 | Jia et al. | |
| 2010/0093247 A1 | 4/2010 | Jiang et al. | |
| 2010/0171099 A1 | 7/2010 | Tombler, Jr. et al. | |
| 2010/0271330 A1 | 10/2010 | Philipp | |
| 2011/0032196 A1 | 2/2011 | Feng et al. | |
| 2011/0043479 A1* | 2/2011 | van Aerle et al. | 345/174 |
| 2012/0105371 A1 | 5/2012 | Hotelling et al. | |

FOREIGN PATENT DOCUMENTS

| | | | |
|---|---|---|---|
| CN | 1447279 A | 10/2003 | |
| CN | 1482472 | 3/2004 | |
| CN | 1483667 | 3/2004 | |
| CN | 1484865 | 3/2004 | |
| CN | 1501317 | 6/2004 | |
| CN | 1503195 | 6/2004 | |
| CN | 1509982 | 7/2004 | |
| CN | 1519196 | 8/2004 | |
| CN | 2638143 | 9/2004 | |
| CN | 1543399 | 11/2004 | |
| CN | 1543399 A | 11/2004 | |
| CN | 2706973 | 6/2005 | |
| CN | 1671481 | 9/2005 | |
| CN | 1675580 | 9/2005 | |
| CN | 1690915 A | 11/2005 | |
| CN | 1738018 | 2/2006 | |
| CN | 1744021 A | 3/2006 | |
| CN | 1745302 | 3/2006 | |
| CN | 1803594 | 7/2006 | |
| CN | 1823320 | 8/2006 | |
| CN | 1292292 C | 12/2006 | |
| CN | 2844974 Y | 12/2006 | |
| CN | 1903793 | 1/2007 | |
| CN | 1942853 | 4/2007 | |
| CN | 1947203 | 4/2007 | |
| CN | 1948144 | 4/2007 | |
| CN | 1315362 | 5/2007 | |
| CN | 1982209 | 6/2007 | |
| CN | 1996620 | 7/2007 | |
| CN | 1998067 | 7/2007 | |
| CN | 101017417 | 8/2007 | |
| CN | 101059738 | 10/2007 | |
| CN | 101165883 | 4/2008 | |
| CN | 101239712 | 8/2008 | |
| CN | 101248411 | 8/2008 | |
| DE | 202007006407 | 9/2007 | |
| EP | 1739692 | 1/2007 | |
| JP | S61-231626 | 10/1986 | |
| JP | 61-283918 | 12/1986 | |
| JP | S62-63332 | 3/1987 | |
| JP | 62-139028 | 6/1987 | |
| JP | S62-182916 | 8/1987 | |
| JP | S62-190524 | 8/1987 | |
| JP | 1-214919 | 8/1989 | |
| JP | H2-8926 | 1/1990 | |
| JP | 1991-54624 | 3/1991 | |
| JP | H3-54624 | 3/1991 | |
| JP | 5-53715 | 3/1993 | |
| JP | H06-28090 | 2/1994 | |
| JP | H6-67788 | 3/1994 | |
| JP | 1995-28598 | 1/1995 | |
| JP | 8-287775 | 11/1996 | |
| JP | H10-63404 | 3/1998 | |
| JP | 10-246605 | 9/1998 | |
| JP | 2001-34419 | 2/2001 | |
| JP | 2001-267782 | 9/2001 | |
| JP | 2002519754 | 7/2002 | |
| JP | 2002-278701 | 9/2002 | |
| JP | 2003-99192 | 4/2003 | |
| JP | 2003-99193 | 4/2003 | |
| JP | 2003-288164 | 10/2003 | |
| JP | 2003303978 | 10/2003 | |
| JP | 2004-26532 | 1/2004 | |
| JP | 2004-102217 | 4/2004 | |
| JP | 2004-189573 | 7/2004 | |
| JP | 2004-253796 | 9/2004 | |
| JP | 2004-266272 | 9/2004 | |
| JP | 2005-67976 | 3/2005 | |
| JP | 2005-85485 | 3/2005 | |
| JP | 2005-117224 | 4/2005 | |
| JP | 2005-176428 | 6/2005 | |
| JP | 2005-182339 | 7/2005 | |
| JP | 2005-222182 | 8/2005 | |
| JP | 2005-286158 | 10/2005 | |
| JP | 2006-171336 | 6/2006 | |
| JP | 2006-228818 | 8/2006 | |
| JP | 2006-243455 | 9/2006 | |
| JP | 2006-521998 | 9/2006 | |
| JP | 2006-269311 | 10/2006 | |
| JP | 2006-285068 | 10/2006 | |
| JP | 2006-330883 | 12/2006 | |
| JP | 2007-11997 | 1/2007 | |
| JP | 2007-31238 | 2/2007 | |
| JP | 2007-73706 | 3/2007 | |
| JP | 2007-112133 | 5/2007 | |
| JP | 2007-123870 | 5/2007 | |
| JP | 2007-161563 | 6/2007 | |
| JP | 2007-161576 | 6/2007 | |
| JP | 2007-182357 | 7/2007 | |
| JP | 2007-182546 | 7/2007 | |
| JP | 2007-229989 | 9/2007 | |
| JP | 2007-299409 | 11/2007 | |
| JP | 2007-310869 | 11/2007 | |
| JP | 2008-102968 | 5/2008 | |
| JP | 2008-139711 | 6/2008 | |
| JP | 2008-536710 | 9/2008 | |
| JP | 2008-542953 | 11/2008 | |
| JP | 2009-104577 | 5/2009 | |
| KR | 0525731 | 11/2005 | |
| KR | 20060129977 | 12/2006 | |
| KR | 20070012414 | 1/2007 | |
| KR | 20070081902 | 8/2007 | |
| KR | 2007-0108077 | 11/2007 | |
| TW | 131955 | 4/1990 | |
| TW | 341684 | 10/1998 | |
| TW | 498266 | 8/2002 | |
| TW | 508652 | 11/2002 | |
| TW | 521227 | 2/2003 | |
| TW | 200403498 | 3/2004 | |
| TW | 242732 | 9/2004 | |
| TW | 200518195 | 6/2005 | |
| TW | I233570 | 6/2005 | |
| TW | I234676 | 6/2005 | |
| TW | 200522366 | 7/2005 | |
| TW | 284963 | 1/2006 | |
| TW | I249134 | 2/2006 | |
| TW | I249708 | 2/2006 | |
| TW | I251710 | 3/2006 | |
| TW | I253846 | 4/2006 | |
| TW | 200622432 | 7/2006 | |
| TW | I258708 | 7/2006 | |
| TW | I261716 | 9/2006 | |
| TW | I267014 | 11/2006 | |
| TW | M306694 | 2/2007 | |
| TW | 200710493 | 3/2007 | |
| TW | 200713337 | 4/2007 | |
| TW | 200717083 | 5/2007 | |
| TW | 200719198 | 5/2007 | |
| TW | D117141 | 5/2007 | |
| TW | 200722559 | 6/2007 | |
| TW | 200727163 | 7/2007 | |
| TW | 284927 | 8/2007 | |
| TW | 200729241 | 8/2007 | |
| TW | 200736979 | 10/2007 | |
| TW | 200737414 | 10/2007 | |

(56) References Cited

FOREIGN PATENT DOCUMENTS

| TW | 200738558 | 10/2007 |
|---|---|---|
| TW | I287669 | 10/2007 |
| TW | 200926471 | 6/2009 |
| TW | 200928914 | 7/2009 |
| TW | 200929638 | 7/2009 |
| TW | 200929643 | 7/2009 |
| TW | 201005612 | 7/2009 |
| WO | WO02076724 | 10/2002 |
| WO | WO02076724 A1 | 10/2002 |
| WO | WO2004019119 | 3/2004 |
| WO | WO2004052559 | 6/2004 |
| WO | WO2004114105 | 12/2004 |
| WO | WO2005102924 | 11/2005 |
| WO | WO2005104141 | 11/2005 |
| WO | WO2006003245 | 1/2006 |
| WO | WO2006014241 | 2/2006 |
| WO | WO2006030981 | 3/2006 |
| WO | WO2006031981 | 3/2006 |
| WO | WO2006120803 | 11/2006 |
| WO | WO2006126604 | 11/2006 |
| WO | WO2006130366 | 12/2006 |
| WO | WO2007008518 | 1/2007 |
| WO | 2007012899 | 2/2007 |
| WO | 2007022226 | 2/2007 |
| WO | WO2007063751 | 6/2007 |
| WO | WO2007066649 | 6/2007 |
| WO | WO2007099975 | 9/2007 |
| WO | WO2008013517 | 1/2008 |

OTHER PUBLICATIONS

ASM Handbook."vol. 2 Properties and Selection: Nonferrous Alloys and Special-Purpose Materials".Apr. 2007; pp. 840-853.

Fan et al. "Self-Oriented Regular Arrays of Carbon Nanotubes and Their Field Emission Properties". Science, vol. 283, (1999);pp. 512-514.

Wu et al."Transparent, Conductive Carbon Nanotube Films". Science,vol. 305,(2004);pp. 1273-1276.

Yoshikazu Nakayama, "Technology Development of CNT Long Yarns and CNT Sheets", Nano Carbon Handbook, Japan TSN Inc, pp. 261-266, Jul. 17, 2007(the First 6 Sentences of 2nd, 3rd,4th Paragraphs and the first 3 sentences of 5th paragraph on p. 262,the 4th paragraph on p. 264 and the 5th sentence of 3rd paragraph on p. 265 may be relevant).

Ri Kurosawa, "Technology Trends of Capacitive Touch Panel", Technology and Development of Touch Panel, Amc, First Impression, pp. 54-64, Dec. 27, 2004(the 6th paragraph on p. 55 may be relevant).

George Gruner, "Carbon Nanonets Spark New Electronics", Scientific American, pp. 76-83, May 2007.

Yagasaki Takuya, Nakanishi Rou, "Resistance Film Type Touch Panel", Technologies and Developments of Touch Panels, Amc, First Impression, pp. 80-93, Dec. 27, 2004(the 2nd Paragraph on p. 81 and the 2nd Paragraph on p. 91 may be relevant).

Mei Zhang etal., "Strong Transparent, Multifunctional, Carbon Nanotube Sheets", Science, America, AAAS, vol. 309, pp. 1215-1219, Aug. 19, 2005.

R Colin Johnson, "Carbon nanotubes aim for cheap, durable touch screens",Aug. 2007 http://psroc.phys.ntu.edu.tw/bimonth/v27/615.pdf.

Xianglin Liu, "strong, transparent, multifunctional carbon nanotube sheets", pp. 720-721, Oct. 2005 http://www.eettaiwan.com/articleLogin.do?artId=8800474428&fromWhere=/ART_8800474428_480502_NT_95e7014f.HTM&catId=480502&newsType=NT&pageNo=null&encode=95e7014f.

Yu Xiang, Technique of Touch Panel & the Production of Resistance-type Touch Panel Insulation Dot, Journal of Longyan Teachers College, p. 25-26, vol. 22, No. 6, 2004.

K. Noda et al. Production of Transparent Conductive Films With Inserted SiO2 Anchor Layer, and Application to a Resistive Touch Panel, Electronics and Communications, Jul. 2001, pp. 39-45, vol. 84, Japan.

Kai-Li Jiang, Qun-Qing Li, Shou-Shan Fan, "Continuous carbon nanotube yarns and their applications", Physics, China, pp. 506-510,Aug. 31, 2003, 32(8) (lines from the 4th line to 35th line in the right col. of p. 507 may be relevant).

Strong, Transparent, Multifunctional, Carbon Nanotube Sheets, Science, American Association for the Advancement of Science, US, vol. 309, Aug. 19, pp. 1215-1219.

Spinning continuous carbon nanotube yarns, Nature, Nature Publishing Group, United Kingdom, vol. 419, Oct. 24, 2002, p. 801.

Spinning and Processing Continuous Yarns from 4-Inch wafer Scale Super-Aligned Carbon Nanotube Arrays, Advanced Materials, Wiley-VCHWerlag GmbH&Co.KGAA,DE, vol. 18, No. 12,Jun. 1, 2006, pp. 1505-1510.

\* cited by examiner

CARBON NANOTUBE BASED FLEXIBLE MOBILE PHONE

RELATED APPLICATIONS

This application claims all benefits accruing under 35 U.S.C. §119 from China Patent Application No. 200910107864.2, filed on Jun. 12, 2009 in the China Intellectual Property Office. This application is related to application Ser. No. 12/286,145, filed Sep. 29, 2008, titled, "TOUCH PANEL AND DISPLAY DEVICE USING THE SAME," application Ser. No. 12/286,216, filed Sep. 29, 2008, titled, "TOUCH PANEL AND DISPLAY DEVICE USING THE SAME," application Ser. No. 12/286,152, filed Sep. 29, 2008, titled, "TOUCH PANEL, METHOD FOR MAKING THE SAME AND DISPLAY DEVICE USING THE SAME", application Ser. No. 12/384,328, filed Apr. 2, 2009, titled, "PERSONAL DIGITAL ASSISTANT," application Ser. No. 12/286,151, filed Sep. 29, 2008, titled, "TOUCH PANEL, METHOD FOR MAKING THE SAME AND DISPLAY DEVICE USING THE SAME," application Ser. No. 12/286, 160, filed Sep. 29, 2008, titled, "TOUCH PANEL AND DISPLAY DEVICE USING THE SAME," application Ser. No. 12/286,146, filed Sep. 29, 2008, titled, "TOUCH PANEL AND DISPLAY DEVICE USING THE SAME," application Ser. No. 12/286,181, filed Sep. 29, 2008, titled, "TOUCH PANEL AND DISPLAY DEVICE USING THE SAME," application Ser. No. 12/286,176, filed Sep. 29, 2008, titled, "TOUCH PANEL AND DISPLAY DEVICE USING THE SAME," application Ser. No. 12/286,219, filed Sep. 29, 2008, titled, "TOUCH PANEL, METHOD FOR MAKING THE SAME AND DISPLAY DEVICE USING THE SAME," application Ser. No. 12/286,189, filed Sep. 29, 2008, titled, "TOUCH PANEL AND DISPLAY DEVICE USING THE SAME," application Ser. No. 12/286,179, filed Sep. 29, 2008, titled, "TOUCH PANEL AND DISPLAY DEVICE USING THE SAME," application Ser. No. 12/286,220, filed Sep. 29, 2008, titled, "TOUCH PANEL AND DISPLAY DEVICE USING THE SAME," application Ser. No. 12/286,227, filed Sep. 29, 2008, titled, "TOUCH PANEL AND DISPLAY DEVICE USING THE SAME," application Ser. No. 12/286, 166, filed Sep. 29, 2008, titled, "TOUCH PANEL AND DISPLAY DEVICE USING THE SAME," application Ser. No. 12/286,178, filed Sep. 29, 2008, titled, "TOUCH PANEL AND DISPLAY DEVICE USING THE SAME," application Ser. No. 12/286,228, filed Sep. 29, 2008, titled, "TOUCH PANEL, METHOD FOR MAKING THE SAME AND DISPLAY DEVICE USING THE SAME," application Ser. No. 12/286,144, filed Sep. 29, 2008, titled, "TOUCH PANEL AND DISPLAY DEVICE USING THE SAME," application Ser. No. 12/286,266, filed Sep. 29, 2008, titled, "TOUCH PANEL," application Ser. No. 12/286,141, filed Sep. 29, 2008, "TOUCH PANEL," application Ser. No. 12/286,148, filed Sep. 29, 2008, titled, "TOUCH PANEL AND DISPLAY DEVICE USING THE SAME," application Ser. No. 12/286, 140, filed Sep. 29, 2008, titled, "TOUCHABLE CONTROL DEVICE," application Ser. No. 12/286,154, filed Sep. 29, 2008, titled, "TOUCH PANEL AND DISPLAY DEVICE USING THE SAME," application Ser. No. 12/286,155, filed Sep. 29, 2008, titled, "TOUCH PANEL, METHOD FOR MAKING THE SAME, AND DISPLAY DEVICE ADOPTING THE SAME," application Ser. No. 12/286,153, filed Sep. 29, 2008, titled, "TOUCH PANEL AND DISPLAY DEVICE USING THE SAME," application Ser. No. 12/286, 184, filed Sep. 29, 2008, titled "TOUCH PANEL AND DISPLAY DEVICE USING THE SAME," application Ser. No. 12/286,175, filed Sep. 29, 2008, titled, "METHOD FOR MAKING TOUCH PANEL," application Ser. No. 12/286, 195, filed Sep. 29, 2008, titled, "METHOD FOR MAKING TOUCH PANEL," application Ser. No. 12/286,227, filed Sep. 29, 2008, titled, "TOUCH PANEL AND DISPLAY DEVICE USING THE SAME," application Ser. No. 12/286,218, filed Sep. 29, 2008, titled, "TOUCH PANEL AND DISPLAY DEVICE USING THE SAME," application Ser. No. 12/286, 1428, filed Sep. 29, 2008, titled, "TOUCH PANEL AND DISPLAY DEVICE USING THE SAME," application Ser. No. 12/286,241, filed Sep. 29, 2008, titled, "TOUCH PANEL AND DISPLAY DEVICE USING THE SAME," application Ser. No. 12/286,143, filed Sep. 29, 2008, titled, "ELECTRONIC ELEMENT HAVING CARBON NANOTUBES," application Ser. No. 12/384,329, filed Apr. 2, 2009, titled, "PERSONAL DIGITAL ASSISTANT," application Ser. No. 12/456,557, filed Jul. 2, 2009, titled, "TOUCH PANEL AND COMPUTER USING THE SAME," application Ser. No. 12/459,544, filed Jul. 2, 2009, titled, "PORTABLE COMPUTER," application Ser. No. 12/583,158, filed Aug. 13, 2009, titled, "MOBILE PHONE."

BACKGROUND

1. Technical Field

The present disclosure relates to mobile phones and, in particular, to a carbon nanotube based flexible mobile phone employed with a flexible touch panel.

2. Description of the Related Art

Conventionally, mobile phones can include a body, a display panel disposed on a surface of the body, a touch panel disposed on the display panel and an input device, such as a keyboard attached on the surface of the body.

At present, different types of touch panels have been developed, including a resistance-type, a capacitance-type, an infrared-type, and a surface sound wave-type. The resistance-type and capacitance-type touch panels have been widely used in mobile phones because of high accuracy and resolution.

A typical capacitance-type touch panel and a resistance-type touch panel includes a transparent conductive layer, such as an indium tin oxide (ITO) layer. However, the ITO layer of the touch panel has poor mechanical durability and poor flexibility.

What is needed, therefore, is a carbon nanotube based flexible mobile phone having an improved touch panel that can overcome the above-described shortcomings.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
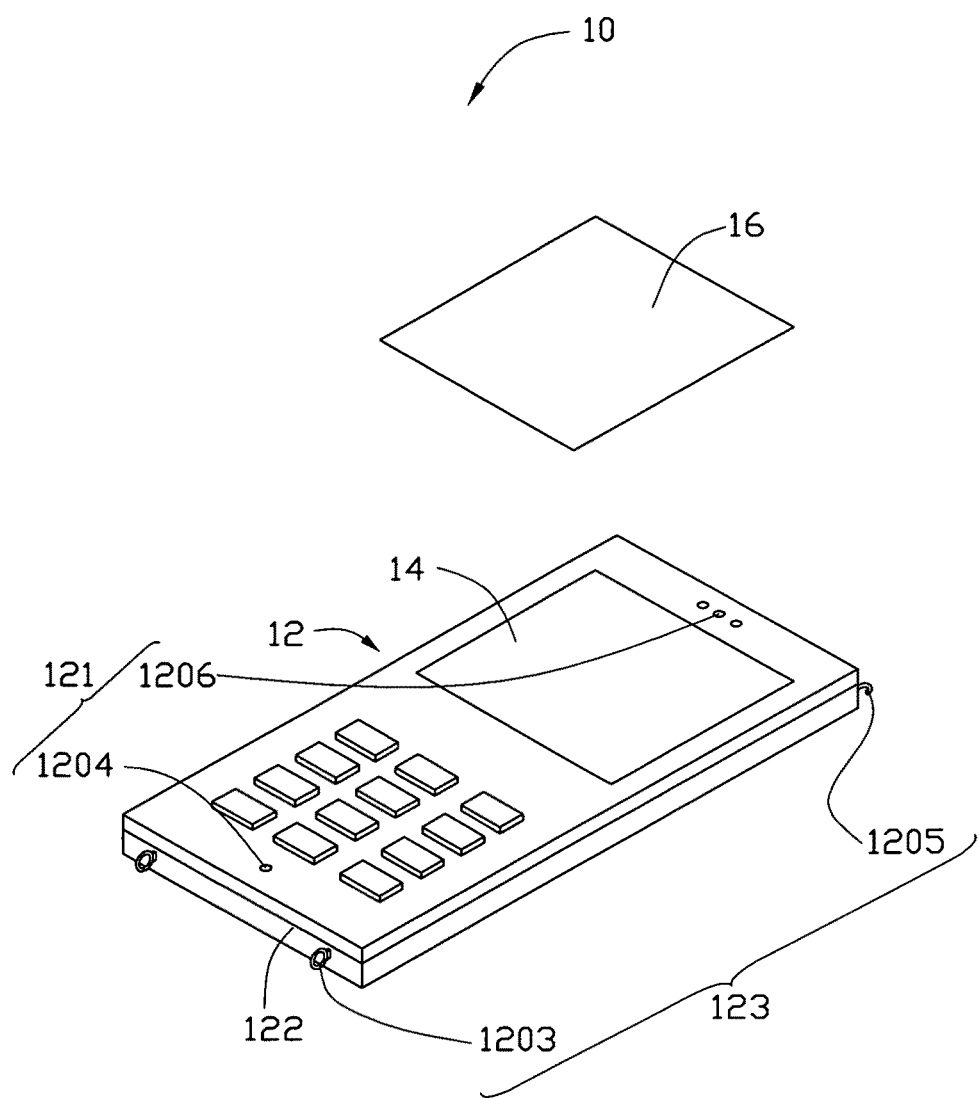
FIG. 1 is a schematic, partially exploded view of a first embodiment of a carbon nanotube based flexible mobile phone having a resistive-type touch panel.
Figure 2:
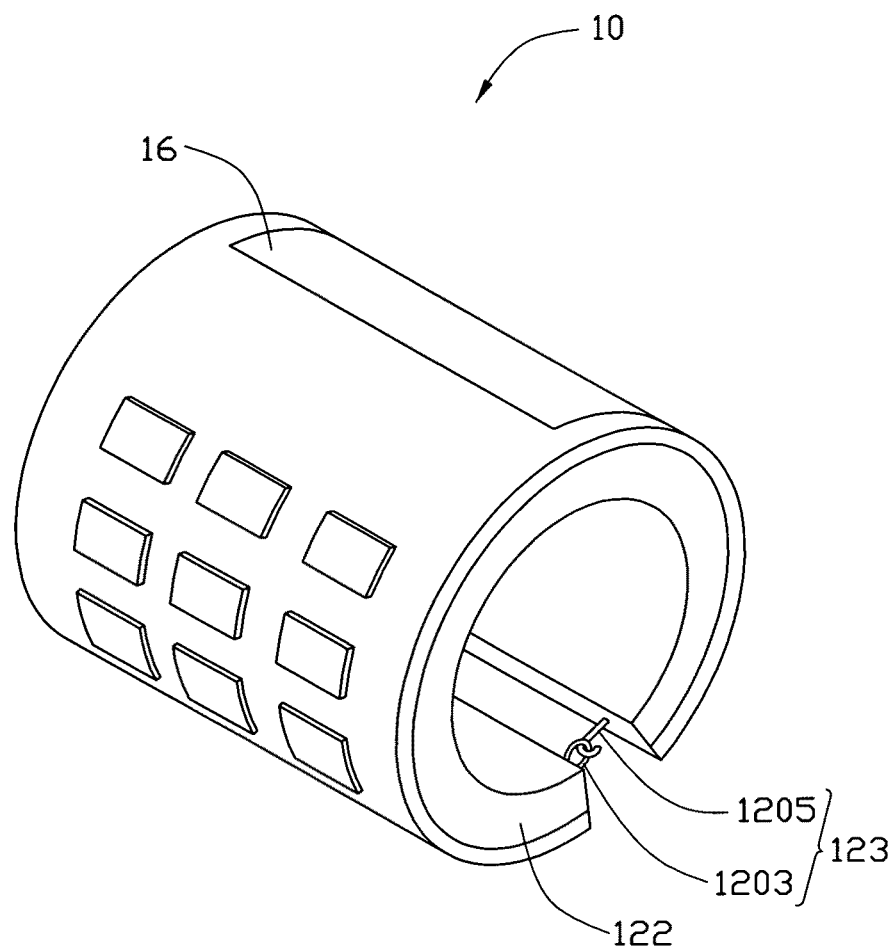
FIG. 2 is a schematic view of the mobile phone of FIG. 1 bent in an annular shape.
Figure 3:
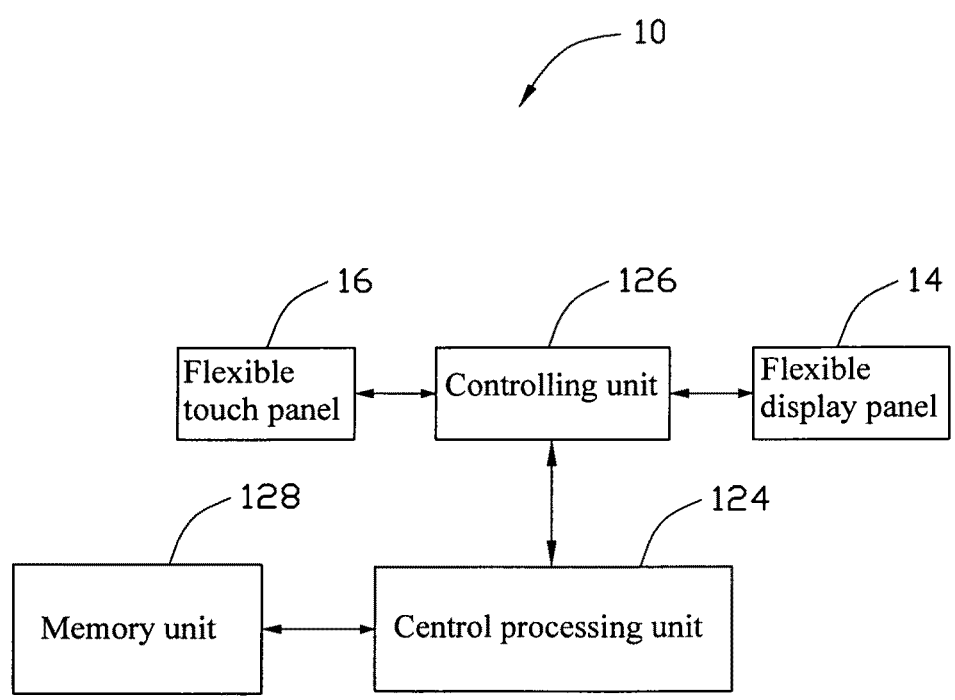
FIG. 3 is a block diagram of the mobile phone of FIG. 1.

Referring to FIGS. 1, 2 and 3, a first embodiment of a carbon nanotube based flexible mobile phone 10 includes a flexible body 12, a flexible display panel 14 and a flexible touch panel 16. The flexible display panel 14 is disposed on the flexible body 12. The flexible touch panel 16 is attached on the flexible display panel 14.

The mobile phone 10 can be bent into an annular or a foldaway shape according to design. Thus, the flexible body 12, the flexible display panel 14 and the flexible touch panel 16 have good flexibility and can be bent repeatedly. In one embodiment, the flexible mobile phone 10 is bent into an annular shape (shown in FIG. 2) and can be worn on one's wrist.

The flexible body 12 may further include a flexible housing 122, a communicating system 121, a central processing unit (CPU) 124, a controlling unit 126, and a memory unit 128. The communicating system 121 includes an antenna, a microphone 1204, and a speaker 1206. The CPU 124, the controlling unit 126, the memory unit 128, the microphone 1204, the speaker 1206, and the flexible display panel 14 are received in the housing 122. The antenna may be received in the flexible housing 122 or extend out of the surface of the housing 122. The CPU 124, the controlling unit 126, and the memory unit 128 may be mounted on a flexible integrated circuit board. The memory unit 128 and the controlling unit 126 are electrically connected to the CPU 124 via conducting lines of the flexible integrated circuit board. The speaker 1206, the microphone 1204, the antenna, the flexible display panel 14, and the flexible touch panel 16 are electrically connected to the controlling unit 126. The controlling unit 126 includes a touch-panel controller, a display controller, and a communicating controller. These controllers are used for controlling the flexible touch panel 16, the flexible display panel 14, the speaker 1206, the microphone 1204, and the antenna. The memory unit 128 includes a random access memory and a read only memory and is configured to store instructions that can be dealt with and executed by the CPU 124, and signals which are displayed via the flexible display panel 14. The antenna receives and sends signals such as radio frequency signals. The radio frequency signals are transported to the CPU 124 and transformed into audio signals. Accordingly, the speaker 1206 works under the control of the controlling unit 126. The microphone 1204 receives sounds and transforms the sounds into audio signals. The audio signals are then transported to the CPU 124 and transformed into radio frequency signals sent out via the antenna under the control of the controlling unit 126.

In one embodiment, a fixture 123 can be disposed on the two ends of the flexible housing 122. The shape and structure of the fixture 123 is arbitrary, and the flexible mobile phone 10 can be fixed by the fixture 123. For example, the fixture 123 can include a threaded hole and a bolt engaging with the threaded hole. In one embodiment shown in FIG. 2, the fixture 123 includes a pair of rings 1203 connected to one end of the flexible mobile phone 10 and a pair of hooks 1205 connected to the other end of the flexible mobile phone 10. The rings 1203 can connect to the hooks 1205 to fix the flexible mobile phone 10 after being bent into an annulus. Since the fixture 123 is an optional device, the fixture 123 can hold the flexible mobile phone 10 into any designed shape.

The flexible display panel 14 may be a flexible liquid crystal display panel, a flexible electrophoretic display, a flexible organic light emitting display (OLED), or any other flexible display. The flexible display panel 14 can be used for displaying information or images. In one embodiment, the flexible display panel 14 is a flexible liquid crystal display panel.

The flexible touch panel 16 may be spaced apart from the flexible display panel 14 or integrated with the flexible display panel 14. When the flexible touch panel 16 is integrated with the flexible display panel 14, it may be directly adhered onto the flexible display panel 14 via paste or share a common substrate with the flexible display panel 14. Users can input instructions for the flexible body 12 via touching or pressing the flexible touch panel 16 by using an input device, such as a pen or finger.

The area of the flexible touch panel 16 can be the same as that of the flexible display panel 14. Understandably, the flexible display panel 14 can display a keyboard to touch.

Figure 4:
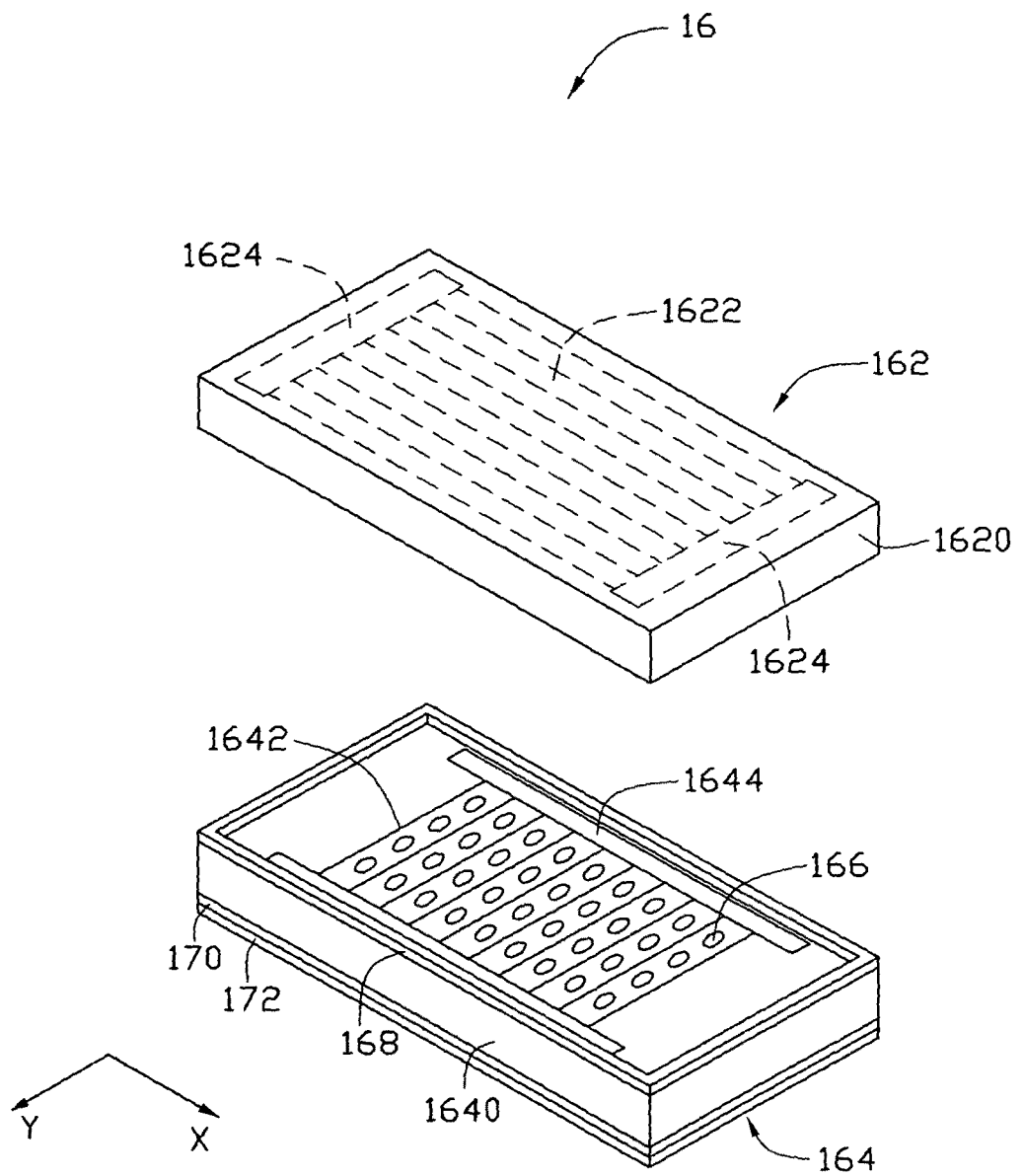
FIG. 4 is an isometric, partially exploded view of a resistive-type touch panel used in the flexible mobile phone of FIG. 1.
Figure 5:
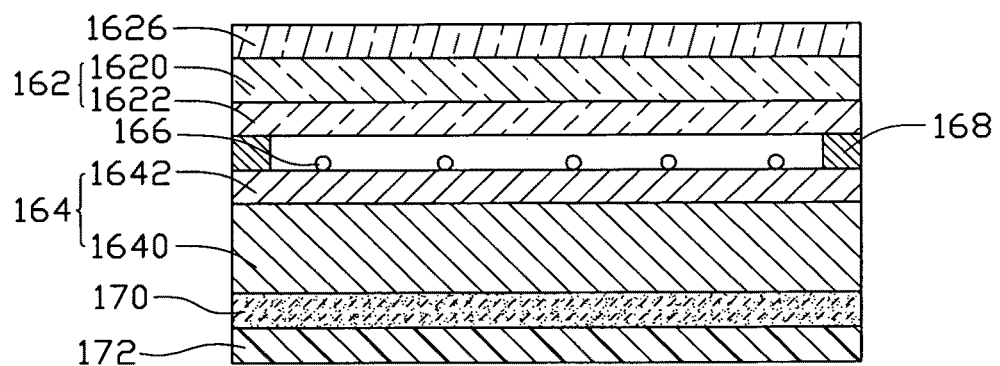
FIG. 5 is a schematic, cross-sectional view of the resistive-type touch panel of FIG. 4.

Referring to FIG. 4 and FIG. 5, the flexible touch panel 16 can be a resistive-type touch panel and includes a first electrode plate 162, a second electrode plate 164, and a plurality of transparent dot spacers 166 disposed between the first electrode plate 162 and the second electrode plate 164. The second electrode plate 164 is directly adhered to the flexible display panel 14.

The first electrode plate 162 includes a first substrate 1620, a first transparent conductive layer 1622, and two first electrodes 1624. The first substrate 1620 has a planar structure, and includes a first surface. The transparent first conductive layer 1622 and the two first electrodes 1624 are mounted on the first surface of the first substrate 1620. The two first electrodes 1624 are respectively disposed on the two ends of the first substrate 1620 along a first direction and electrically connected to the first transparent conductive layer 1622. In one embodiment, the first direction is marked as the X-direction. The second electrode plate 164 includes a second substrate 1640, a second transparent conductive layer 1642 and two second electrodes 1644. The second substrate 1640 has a planar structure, and includes a second surface. The second surface of the second substrate 1640 is facing the first surface of the first substrate 1620. The second transparent conductive layer 1642 and the two second electrodes 1644 are disposed on the second surface of the second substrate 1640. The two second electrodes 1644 are respectively disposed on the two ends of the second transparent conductive layer 1642 along a second direction and electrically connected to the second transparent conductive layer 1642. The second direction is marked as the Y direction. The X direction is substantially perpendicular to the Y direction, thus, the two first electrodes 1624 are substantially orthogonal to the two second electrodes 1644.

The first substrate 1620 and the second substrate 1640 can be a transparent and flexible film or plate made of polymer, resin, or any other suitable flexible material. The flexible touch panel 16 can share the second substrate 1640 with the flexible display panel 14. A material of the flexible film or plate can be one or more of polycarbonate (PC), polymethyl methacrylate acrylic (PMMA), polyethylene terephthalate (PET), polyether polysulfones (PES), polyvinyl polychloride (PVC), benzocyclobutenes (BCB), polyesters, and acrylic resins. The thickness of the first substrate 1620 and the second substrate 1640 can be in the range from about 1 millimeter (mm) to about 1 centimeter (cm). In one embodiment, the first substrate 1620 and the second substrate 1640 is made of PET, and the thickness of the first substrate 1620 and the second substrate 1640 is about 2 mm. Understandably, the material of the first substrate 1620 and the second substrate 1640 can be chosen according to a demand of the supporting role, flexibility and bendable capability.

Furthermore, an insulating pad 168 can be disposed on the periphery of the second surface of the second electrode plate 164. The first electrode plate 162 is disposed on the insulating pad 168. The first transparent conductive layer 1622 of the first electrode plate 162 is facing the second transparent conductive layer 1642 of the second electrode plate 164. The plurality of transparent dot spacers 166 is spaced apart from one another and disposed on the second transparent conductive layer 1642 of the second electrode plate 164. A distance between the first and second electrode plates 162, 164 is in a range of about 2 mm to about 100 micrometers (μm). The insulating pad 168 and the dot spacers 166 can be made of transparent resin or the like, for insulating the first electrode plate 162 with the second electrode plate 164. Understandably, if the resistive touch panel 16 is small enough, the dot spacers 166 may be omitted.

A transparent protective film 1626 may be disposed on the top surface of the first electrode plate 162. The transparent protective film 1626 may be directly adhered on the first electrode plate 162 via paste, or combined with the first electrode plate 162 via a heat-press method. The transparent protective film 1626 may be a plastic layer or a resin layer, which are treated via surface rigid treating. The resin layer may be made of benzo cyclo butane (BCB), polymethyl methacrylate (PMMA), polymer resin, polyethylene terephthalate (PET), or the like. In one embodiment, the transparent protective film 1626 is made of PMMA, and configured for protecting the first electrode plate 162 by improving wearability thereof. The transparent protective film 1626 may provide some additional function, such as decreasing glare and reflection.

The first and second transparent conductive layers 1622, 1642 are made of a carbon nanotube layer. The carbon nanotube layer includes one or more carbon nanotube films. The carbon nanotube film is formed by a plurality of carbon nanotubes, ordered or otherwise, and has a uniform thickness. The carbon nanotube film can be an ordered film or a disordered film. The ordered carbon nanotube film consists of ordered carbon nanotubes. Ordered carbon nanotube films include films where the carbon nanotubes are arranged along a primary direction. Examples include films where the carbon nanotubes are arranged approximately along a same direction or have two or more sections within each of which the carbon nanotubes are arranged approximately along a same direction (different sections can have different directions). In the ordered carbon nanotube film, the carbon nanotubes can be primarily oriented along a same direction. However, the ordered carbon nanotube film can also have sections of carbon nanotubes aligned in a common direction. The ordered carbon nanotube film can have two or more sections, and the sections can have different alignments. The ordered carbon nanotube film may have a free-standing structure. The free-standing carbon nanotube film may include two types. One type is that the carbon nanotube film needs no substrate to support the carbon nanotubes thereof. Another type is that the carbon nanotube film only needs one or more supporting dots (not shown) to support one or more points thereof. Thus, left parts of the carbon nanotube film are hung. In the ordered carbon nanotube films, the carbon nanotubes are oriented along a same preferred orientation and approximately parallel to each other. The term "approximately" as used herein means that it is impossible and unnecessary that each of carbon nanotubes in the carbon nanotube films be exactly parallel to one another, namely that every carbon nanotubes is parallel to each other, because in the course of fabricating the carbon nanotube film, some factor, such as the change of drawing speed, affects the non-uniform drawing force on the carbon nanotube film as the carbon nanotube film is drawn from a carbon nanotube array. A film can be drawn from a carbon nanotube array, to form the ordered carbon nanotube film, namely a drawn carbon nanotube film. The drawn carbon nanotube film includes a plurality of successive and oriented carbon nanotubes joined end-to-end by van der Waals attractive force therebetween. The drawn carbon nanotube film is a free-standing film. The carbon nanotube film can be treated with an organic solvent to increase the mechanical strength and toughness of the carbon nanotube film and reduce the coefficient of friction of the carbon nanotube film. A thickness of the carbon nanotube film can range from about 0.5 nanometers (nm) to about 100 μm.

The disordered carbon nanotube film consists of disordered carbon nanotubes. Disordered carbon nanotube films include randomly aligned carbon nanotubes. When the disordered carbon nanotube film has a number of the carbon nanotubes aligned in every direction that are substantially equal, the disordered carbon nanotube film can be isotropic. The disordered carbon nanotubes can be entangled with each other and/or are approximately parallel to a surface of the disordered carbon nanotube film. The disordered carbon nanotube film may be a flocculated carbon nanotube film. The flocculated carbon nanotube film can include a plurality of long, curved, disordered carbon nanotubes entangled with each other. Furthermore, the carbon nanotubes in the flocculated carbon nanotube film can be isotropic. The carbon nanotubes can be substantially uniformly dispersed in the carbon nanotube film. Adjacent carbon nanotubes are attracted by van der Waals attractive force to form an entangled structure with micropores defined therein. It is understood that the flocculated carbon nanotube film is very porous. Sizes of the micropores can be less than 10 μm. The porous nature of the flocculated carbon nanotube film will increase specific surface area of the carbon nanotube structure. Furthermore, due to the carbon nanotubes in the flocculated carbon nanotube film being entangled with each other, the touch panel 10 employing the flocculated carbon nanotube film has excellent durability, and can be fashioned into desired shapes with a low risk to the integrity of the flocculated carbon nanotube film. The thickness of the flocculated carbon nanotube film can range from about 0.5 nm to about 1 μm.

The pressed carbon nanotube film can be a free-standing carbon nanotube film. The carbon nanotubes in the pressed carbon nanotube film may be arranged along a same direction or arranged along different directions. When the carbon nanotubes in the pressed carbon nanotube film are arranged along a same direction, the pressed carbon nanotube film is a ordered carbon nanotube film. When the carbon nanotubes in the pressed carbon nanotube film are arranged along different directions, the pressed carbon nanotube film is a disordered carbon nanotube film. The carbon nanotubes in the pressed carbon nanotube film can rest upon each other. Adjacent carbon nanotubes are attracted to each other and combined by van der Waals attractive force. An angle between a primary alignment direction of the carbon nanotubes and a surface of the pressed carbon nanotube film is approximately 0 degrees to approximately 15 degrees. The greater the pressure applied, the smaller the angle formed. When the carbon nanotubes in the pressed carbon nanotube film are arranged along different directions, the pressed carbon nanotube film can be isotropic. The thickness of the pressed carbon nanotube film ranges from about 0.5 nm to about 1 mm. Examples of pressed carbon nanotube film are taught by US application 20080299031A1 to Liu et al.

A length and a width of the carbon nanotube film can be arbitrarily set as desired. A thickness of the carbon nanotube film is in a range from about 0.5 nm to about 100 μm. The carbon nanotubes in the carbon nanotube film can be selected from the group consisting of single-walled, double-walled, multi-walled carbon nanotubes, and combinations thereof. Diameters of the single-walled carbon nanotubes, the double-walled carbon nanotubes, and the multi-walled carbon nanotubes can, respectively, be in the approximate range from about 0.5 nm to about 50 nm, about 1 nm to about 50 nm, and about 1.5 nm to about 50 nm.

Figure 6:
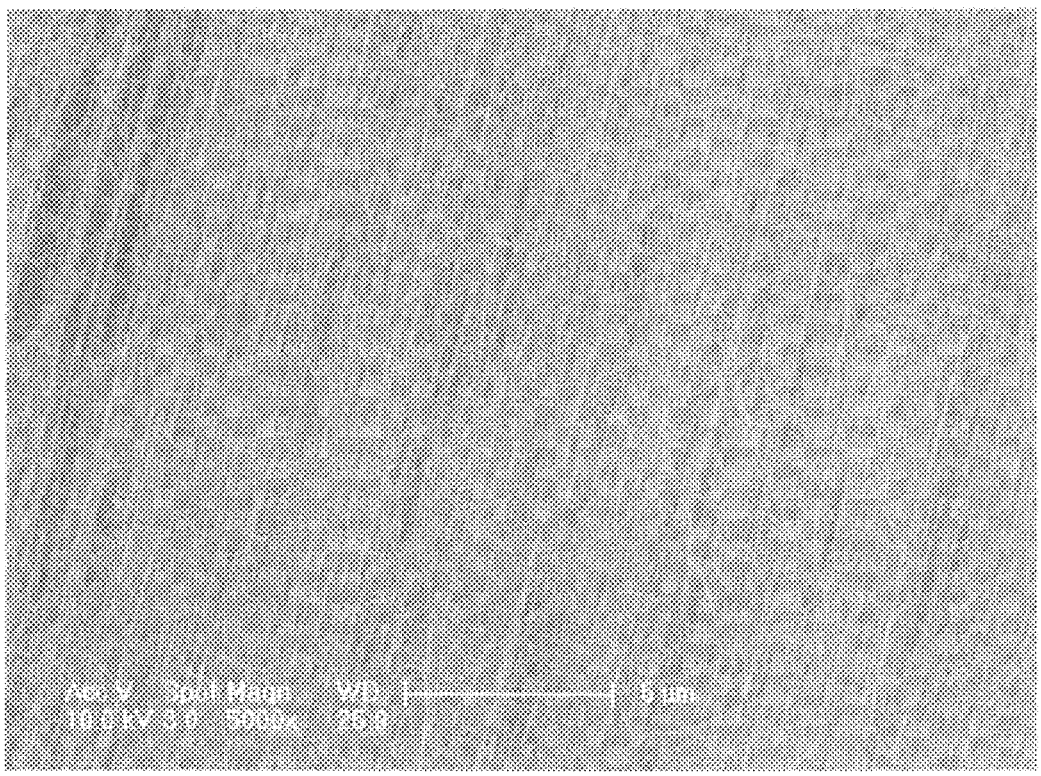
FIG. 6 is a scanning electron microscope image of a carbon nanotube film used in the resistive touch panel of FIG. 4.

Referring to FIG. 6, in one embodiment, the first transparent conductive layer 122 and the second transparent conductive layer 124 each include a carbon nanotube layer. The carbon nanotube layer is an ordered carbon nanotube film. The carbon nanotube layer may include a number of carbon nanotube films stacked with each other. The carbon nanotubes of each of the carbon nanotube films are arranged alone a preferred orientation. The carbon nanotube film includes a number of carbon nanotube segments joined end-to-end via van der Waals attractive forces therebetween. The carbon nanotube segments have a substantially same length and are composed of a number of approximately parallel arranged carbon nanotubes. In the present embodiment, the carbon nanotube films of the first transparent conductive layer 1622 are overlapped alone the first direction X, and the carbon nanotube films of the second transparent conductive layer 1624 are overlapped along the second direction Y. The first direction X is crossed with the second direction Y. The carbon nanotube films have thickness of about 0.5 nm to 100 mm and width of 0.01 cm to about 10 cm.

The flexible mobile phone 10 may further include a shielding layer 170 disposed on the bottom surface of the flexible touch panel 16. The material of the shielding layer 170 can be a conductive resin film, a carbon nanotube film, or another kind of flexible and conductive film. In one embodiment, the shielding layer 170 is a carbon nanotube film. The carbon nanotube film includes a plurality of carbon nanotubes, and the orientation of the carbon nanotubes therein can be arbitrarily determined. Understandably, the carbon nanotubes in the carbon nanotube film of the shielding layer 170 can be arranged along a same direction. The carbon nanotube film is connected to ground and acts as shielding, thus enabling the flexible touch panel 16 to operate without interference (e.g., electromagnetic interference).

The flexible mobile phone 10 may further include a passivation layer 172 interposed between the flexible display panel 14 and the shielding layer 170. The passivation layer 172 is used for preventing crosstalk, electrochemical corrosion, and so on, or reducing power consumption. The passivation layer 172 may be made of BCB, polymer resin and the like.

Figure 7:
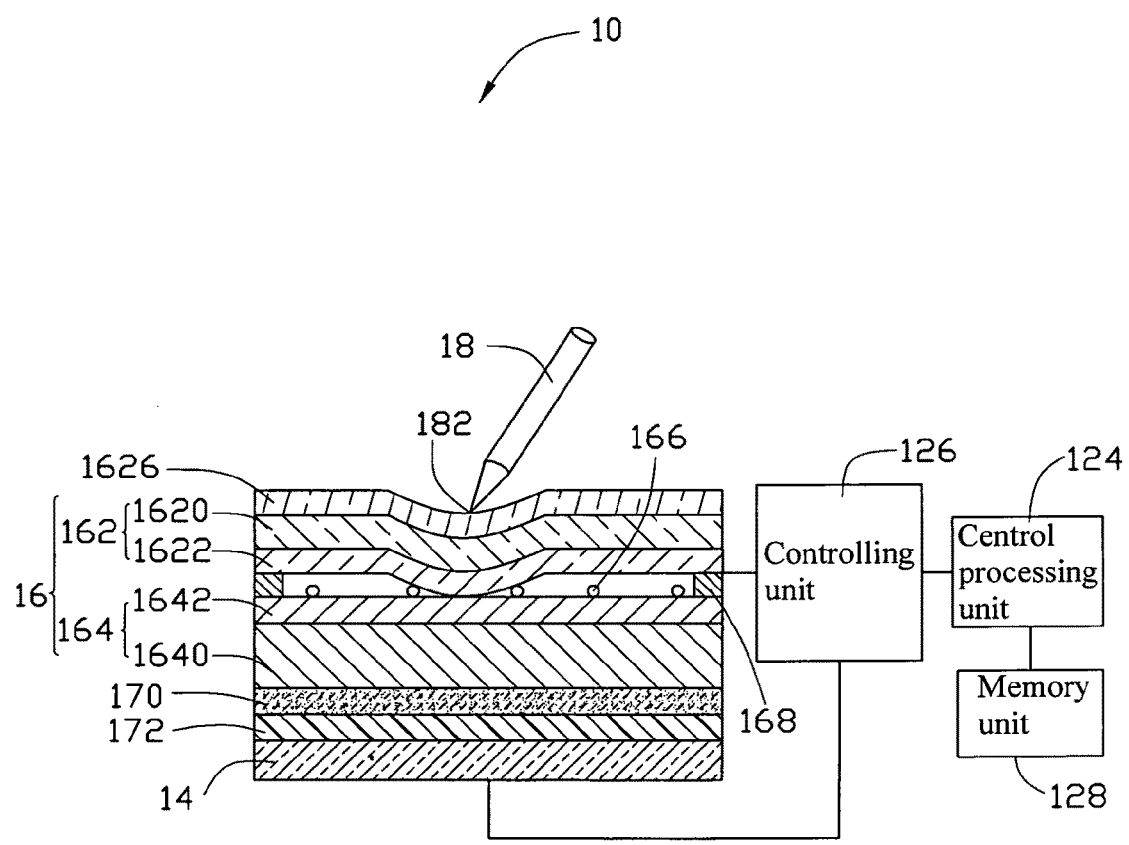
FIG. 7 is a schematic view of the resistive-type touch panel of FIG. 4 when in use.
Figure 8:
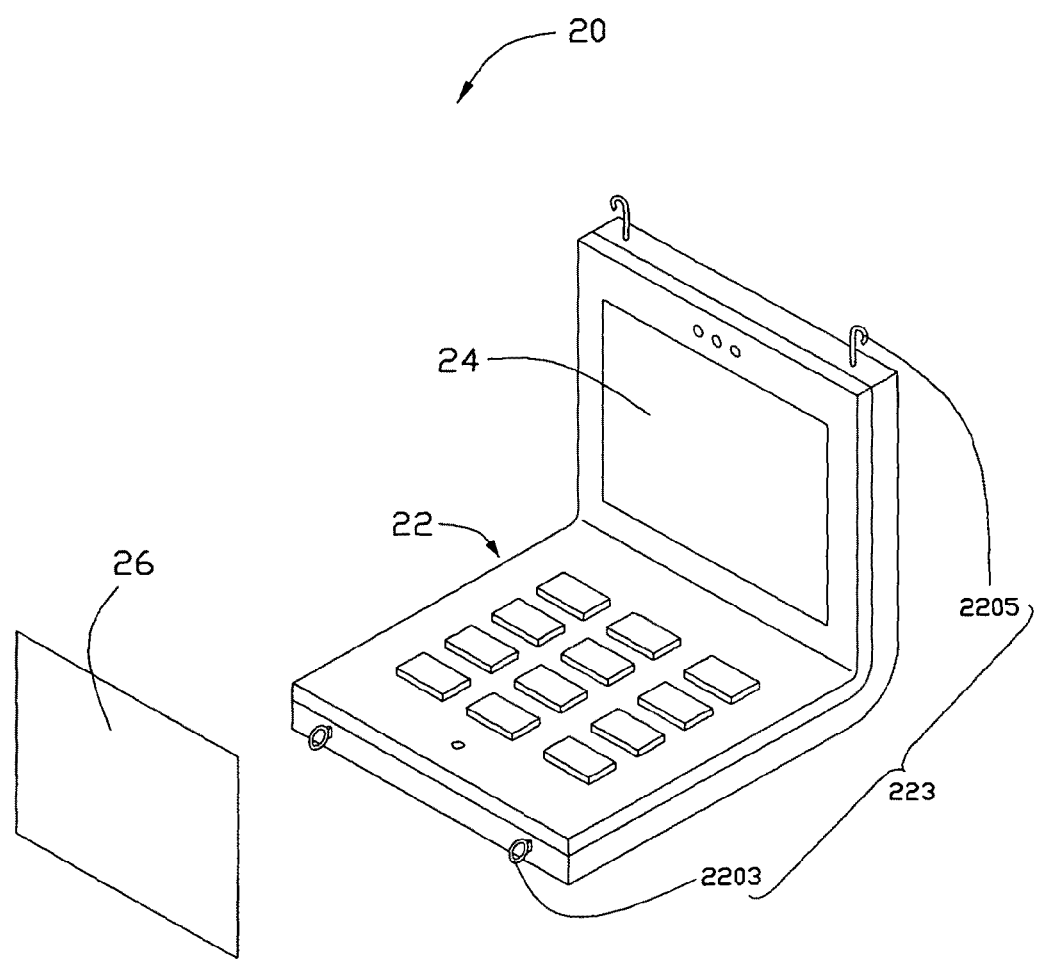
FIG. 8 is a schematic, partially exploded view of a second embodiment of a carbon nanotube based flexible mobile phone having a capacitive-type touch panel, shown in a foldaway position.
Figure 9:
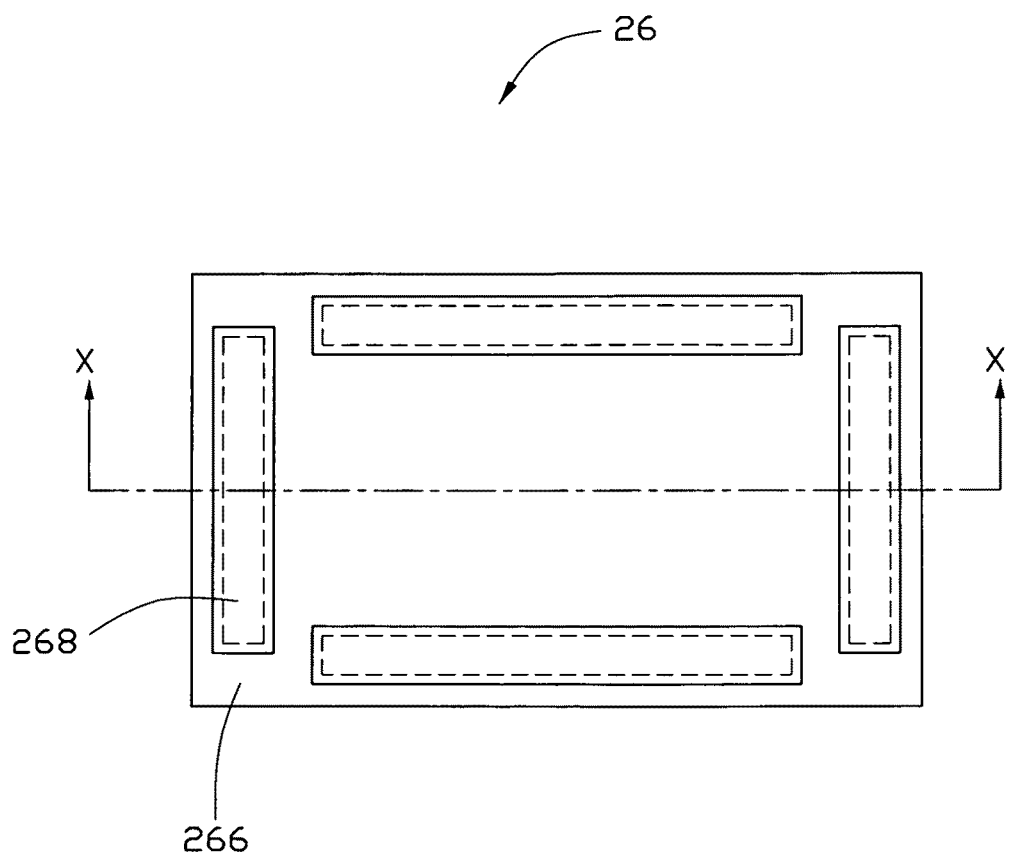
FIG. 9 is a top-view of the capacitive-type touch panel used in the mobile phone of FIG. 8.
Figure 10:
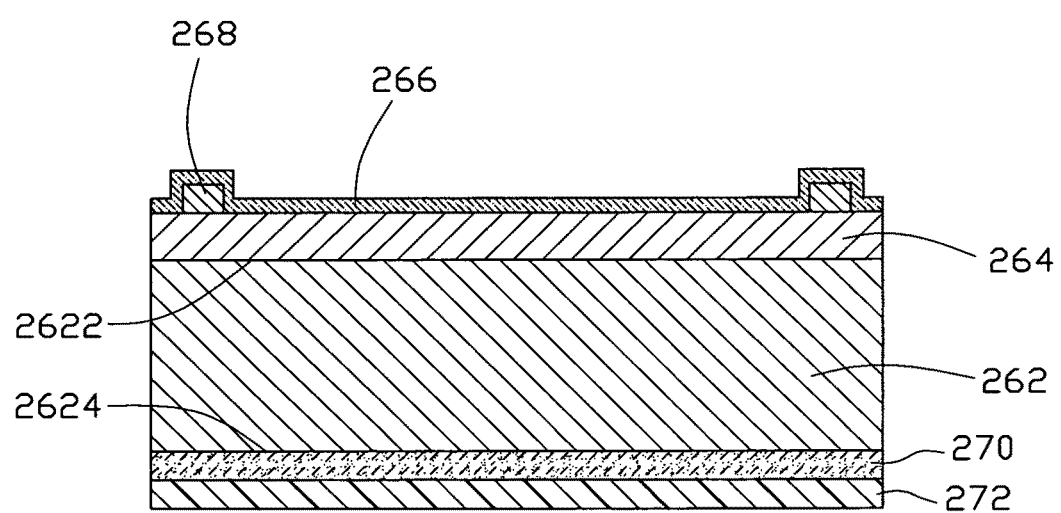
FIG. 10 is a schematic, cross-sectional view of the capacitive-type touch panel of FIG. 9, taken alone line X-X.
Figure 11:
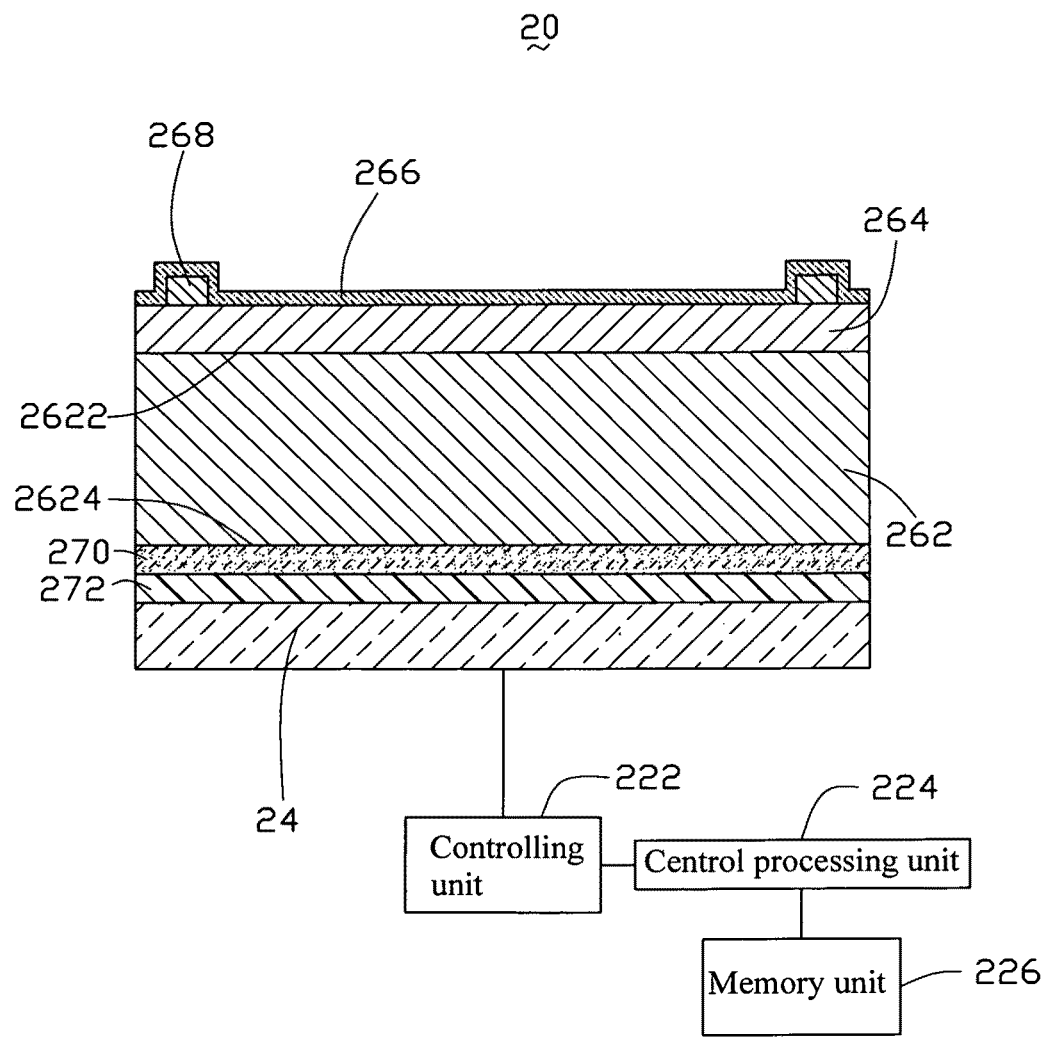
FIG. 11 is a schematic, cross-sectional view of the capacitive-type touch panel of FIG. 9 when in use.

Referring to FIG. 7, in operation, a voltage of about 5 volts, for example, is applied to the first and second electrodes plate 162, 164 via the controlling unit 126. A user operates the flexible mobile phone 10 by pressing or touching the touch panel 16 with a touch tool 18, such as a finger, or a pen/stylus, while visually observing the flexible display panel 14 through the touch panel 16. This pressing causes a deformation 182 of the first electrode plate 162. The deformation 182 of the first electrode plate 162 causes a connection between the first transparent conductive layer 1622 and the second transparent conduction layer 1642 of the second electrode plate 164. Changes in voltages in the first direction of the first transparent conductive layer 1622 and the second direction of the second transparent conductive layer 1642 can be detected by the controlling unit 126. The controlling unit 126 then transforms the changes in voltages into coordinates of the pressing point and sends the coordinates thereof to the CPU 124. The CPU 124 then sends out commands according to the coordinates of the pressing point, and sends the commands to the controlling unit 126. The controlling unit 126 controls the flexible display panel 14, the antenna, the microphone 1204, and the speaker 1206 to operate according to the commands.

Referring to FIG. 8 to FIG. 11, a second embodiment of a flexible mobile phone 20 includes a flexible body 22, a flexible display panel 24 and a flexible touch panel 26. The flexible body 22 defines the flexible display panel 24 thereon. The flexible touch panel 26 is disposed on the flexible display panel 24 far away from the flexible body 22. A fixture 223 can be disposed on the ends of the flexible body 22. One embodiment of the fixture 223 includes two rings 2203 on one end of the flexible body 22 and two hooks 2205 on the other end of the flexible body 22.

In one embodiment, the flexible mobile phone 20 is a foldaway flexible mobile phone. The flexible mobile phone 20 can be bent to reduce the volume when not in use, and can be opened when in use. The way the flexible mobile phone 20 is bent is arbitrary. Thus, the flexible mobile phone 20 is portable.

The flexible touch panel 26 can be a capacitive-type touch panel. The flexible touch panel 26 includes a substrate 262, a transparent conductive layer 264, at least two electrodes 268, and a transparent protective film 266. The substrate 262 is adjacent to the flexible display panel 24. The flexible touch panel 26 shares a common substrate 262 with the flexible display panel 24. The substrate 262 includes a first surface 2622 and a second surface 2624 opposite to the first surface 2622. The first surface 2622 is far away from the flexible display panel 24. The transparent conductive layer 264 is mounted on the first surface 2622 of the substrate 262. At least two electrodes 268 are disposed at the periphery of the transparent conductive layer 264, spaced from each other, and electrically connected to the transparent conductive layer 264 to form equipotential lines thereon. The transparent protective layer 266 can be directly disposed on the transparent conductive layer 264 and the electrodes 268.

In the present embodiment, the four electrodes 268 are respectively disposed towards the edges or corner of the transparent conductive layer 264 and are electrically connected therewith to form an equipotential surface on the transparent conductive layer 264. Understandably, the four electrodes 268 can be disposed on different surfaces of the transparent conductive layer 264 as long as equipotential lines can be formed on the transparent conductive layer 24.

Understandably, the four electrodes 268 can be disposed between the transparent conductive layer 264 and the substrate 262 and electrically connected to the transparent conductive layer 264.

The substrate 262 has a curved structure or a planar structure and functions as a supporter for the flexible touch panel 26. The substrate 262 can be made of polymer, resin, or any other suitable flexible material. A material of the substrate 262 can be one or more of polycarbonate (PC), polymethyl methacrylate acrylic (PMMA), polyethylene terephthalate (PET), polyether polysulfones (PES), polyvinyl polychloride (PVC), benzocyclobutenes (BCB), polyesters, and acrylic resins. The thickness of the substrate 262 can be in the range from about 1 μm to about 1 cm. In one embodiment, the thickness of the substrate 262 is about 2 mm, and the material of the substrate 262 is PET.

The transparent conductive layer 264 includes a carbon nanotube layer. The carbon nanotube layer includes a number of uniformly arranged carbon nanotubes, and the carbon nanotubes are orderly, or disorderly arranged. In the present embodiment, the carbon nanotube layer of the transparent conductive layer 24 has the same configuration as the first and second transparent conductive layer 1622, 1642 of the first embodiment of the flexible mobile phone 10. Specifically, the carbon nanotube layer can include two ordered carbon nanotube films or disordered carbon nanotube films laid along two different directions.

The four electrodes 268 are made of metal, a carbon nanotube thin film, or the like. In the present embodiment, the four electrodes 268 are layers of silver, copper, or foils of metal having strip-shaped structures.

In order to prolong the life of the transparent conductive layer 264 and limit capacitance between the touch point and the transparent conductive layer 264, a transparent protective film 266 is disposed on the transparent conductive layer 264 and the electrodes 268. The transparent protective film 266 is made of benzocyclobutenes (BCB), polyesters, acrylic resins or the like, and configured for protecting the transparent conductive layer 264 by improving wearability thereof. The transparent protective film 266 may provide some additional function, such as decreasing glare and reflection after special treatment.

In the present embodiment, the transparent protective film 266, which is made of polyethylene terephthalate (PET), is disposed on the transparent conductive layer 264 on which the electrodes 28 are mounted. The transparent protective film 266 has a hardness of 7H (H established according to Rockwell hardness test). Understandably, the hardness and the thickness of the transparent protective film 266 may be varied in practice as desired. The transparent protective film 266 is directly adhered on the transparent conductive layer 264 via paste.

The flexible mobile phone 20 further includes a shielding layer 270 disposed on the second surface 2624 of the substrate 262 when the flexible touch panel 26 is integrated with the flexible display panel 24. The material of the shielding layer 270 can be conductive resin films, carbon nanotube films, or other flexible and conductive films. In the present embodiment, the shielding layer 270 is a carbon nanotube film. The carbon nanotube film includes a plurality of carbon nanotubes, and the orientation of the carbon nanotubes therein can be arbitrarily determined. Understandably, the carbon nanotubes in the carbon nanotube film of the shielding layer 270 can be arranged along a same direction. The carbon nanotube film is connected to ground and acts as shielding, thus enabling the flexible touch panel 26 to operate without interference (e.g., electromagnetic interference).

The flexible mobile phone 20 may further include a passivation layer 272 interposed between the flexible display panel 24 and the flexible touch panel 26. The passivation layer 272 prevents crosstalk, electrochemical corrosion, reducing power consumption, and so on. The passivation layer 272 is disposed between the shielding layer 270 and the flexible display panel 24. The passivation layer 272 may be made of benzocyclobutenes (BCB), polyesters, acrylic resins, or the like.

In use, a voltage is applied to the transparent conductive layer 264 via the electrodes 268, thereby forming an equipotential surface on the transparent conductive layer 264. A user operates the flexible display panel 24 by pressing or touching the transparent protective film 266 of the flexible touch panel 26 with a touch tool, such as a finger, or an electrical pen/stylus, while visually observing the flexible display panel 24 through the flexible touch panel 26. Due to an electrical field of the user, a coupling capacitance forms between the touch tool and the transparent conductive layer 264. For high frequency electrical current, the coupling capacitance is a conductor, and thus the touch tool takes away a little current from the touch point. Currents flowing through the four electrodes 268 cooperatively replace the current lost at the touch point. The quantity of current supplied by each electrode 268 is directly proportional to the distance from the touch point to the electrode 268. The controlling unit 222 is used to calculate the proportion of the four supplied currents, thereby detecting coordinates of the touch point on the flexible touch panel 26. Then the controlling unit 222 sends the coordinates of the touch point to the CPU 224. The CPU 224 receives the coordinates, and processes the coordinates into a command. Finally, the CPU 224 sends out the command to the controlling unit 222. The controlling unit 222 controls the display of the flexible display panel 24 accordingly.

As described above, the carbon nanotube films employed in the flexible touch panel has superior properties, such as excellent flexibility and bendable. Thus, the flexible touch panel and the flexible mobile phone using the same will have excellent flexibility and bendable. Furthermore, the carbon nanotube films have high transparency, thereby promoting improved brightness of the flexible touch panel and the flexible mobile phone using the same. Additionally, since the carbon nanotubes have excellent electrical conductivity properties, the carbon nanotube films have a uniform resistance distribution. Thus, the flexible touch panel and the flexible mobile phone adopting the carbon nanotube films have improved sensitivity and accuracy.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. A carbon nanotube based flexible mobile phone, comprising:
    a flexible body having a flexible display panel;
    a communicating system disposed in the flexible body;
    a flexible touch panel attached on the flexible display panel, the flexible touch panel is a resistive-type touch panel, the resistive-type touch panel comprising a first electrode plate and a second electrode plate spaced apart from the first electrode plate;
    the first electrode plate comprising a first flexible substrate defining a first surface, a first transparent conductive layer mounted on the first surface of the first substrate, and two first electrodes, the two first electrodes being fixed on two ends of the first transparent conductive layer in an interval along a first direction; the first transparent conductive layer comprises a first carbon nanotube layer, the first carbon nanotube layer comprising a plurality of first carbon nanotubes arranged approximately along the first direction; and the second electrode plate comprises a second transparent substrate defining a second surface away from the display panel, a second transparent conductive layer mounted on the second surface of the second transparent substrate, and two second transparent electrodes, the two second transparent electrodes being fixed on the two ends of the first transparent conductive layer, the second conductive layer and the two second transparent electrodes of the second electrode plate facing the first electrode plate, the second transparent conductive layer comprising a second carbon nanotube layer, the second carbon nanotube layer comprising a plurality of second carbon nanotubes arranged approximately along a second direction substantially perpendicular to the first direction.

2. The carbon nanotube based flexible mobile phone as claimed in claim 1, wherein the resistive-type touch panel comprises an insulated pad interposed between peripheries of the first and second electrode plates to space the first electrode plate from the second electrode plate.

3. The carbon nanotube based flexible mobile phone as claimed in claim 1, wherein the first electrodes and the second transparent electrodes are fixed on opposite ends of the first and second transparent conductive layer, respectively.

4. The carbon nanotube based flexible mobile phone as claimed in claim 1, wherein the resistive-type touch panel comprises a plurality of transparent dot spacers sandwiched between the first and second electrode plates to space the first electrode plate from the second electrode plate.

5. The carbon nanotube based flexible mobile phone as claimed in claim 1, wherein both the first carbon nanotube layer and the second carbon nanotube layer is at least one carbon nanotube film.

6. The carbon nanotube based flexible mobile phone as claimed in claim 5, wherein the at least one carbon nanotube film is a drawn carbon nanotube film, the carbon nanotubes in the drawn carbon nanotube film are oriented substantially along a same preferred orientation and approximately parallel to each other.

7. The carbon nanotube based flexible mobile phone as claimed in claim 5, wherein the at least one carbon nanotube film is a pressed carbon nanotube film, the carbon nanotubes in the pressed carbon nanotube film are arranged substantially along a same direction.

* * * * *